US012758898B2

(12) United States Patent
Subramaniyam

(10) Patent No.: US 12,758,898 B2
(45) Date of Patent: Oct. 13, 2026

(54) POLYMERIZATION INHIBITING AND EMULSION BREAKING COMPOSITION AND METHOD OF USE THEREOF

(71) Applicant: DORF KETAL CHEMICALS (INDIA) PRIVATE LIMITED, Mumbai (IN)

(72) Inventor: Mahesh Subramaniyam, Singapore (SG)

(73) Assignee: DORF KETAL CHEMICALS (INDIA) Private Limited, Mumbai (IN)

( * ) Notice: Subject to any disclaimer, the term of this patent is extended or adjusted under 35 U.S.C. 154(b) by 584 days.

(21) Appl. No.: 18/273,004

(22) PCT Filed: Jan. 3, 2022

(86) PCT No.: PCT/IB2022/050021
§ 371 (c)(1),
(2) Date: Jul. 18, 2023

(87) PCT Pub. No.: WO2022/157586
PCT Pub. Date: Jul. 28, 2022

(65) Prior Publication Data

US 2024/0082753 A1 Mar. 14, 2024

(30) Foreign Application Priority Data

Jan. 20, 2021 (IN) ............................ 202121002790

(51) Int. Cl.
*B01D 17/04* (2006.01)
*C10G 33/04* (2006.01)

(52) U.S. Cl.
CPC ........... *B01D 17/047* (2013.01); *C10G 33/04* (2013.01)

(58) Field of Classification Search
None
See application file for complete search history.

(56) References Cited

U.S. PATENT DOCUMENTS 5,582,808 A * 12/1996 Patek ..................... C10G 19/02 526/74
6,986,839 B2 1/2006 Subramaniyam et al.
2006/0041028 A1* 2/2006 Crews ...................... C09K 8/52 516/135
2019/0071610 A1* 3/2019 Tang ...................... C10G 19/04
2020/0353380 A1 11/2020 Subramaniyam

OTHER PUBLICATIONS

Foreign communication from the priority International Application No. PCT/IB2022/050021, International Search Report and Written Opinion, Mar. 16, 2022, 9 pages.
Foreign communication from the priority International Application No. PCT/IB2022/050021, International Preliminary Report on Patentability of the International Preliminary Examining Authority, Nov. 30, 2022, 8 pages.

* cited by examiner

*Primary Examiner* — Jeffrey D Washville
(74) *Attorney, Agent, or Firm* — Conley Rose, P.C.; Rodney B. Carroll

(57) ABSTRACT

The present invention relates to a polymerization inhibiting and emulsion breaking composition for inhibiting polymerization and simultaneously breaking emulsions formed between hydrocarbon and caustic, wherein the composition comprises: amino acid and a borohydride, wherein the amino acid is preferably 6-amino hexanoic acid and the borohydride is preferably a sodium borohydride. In one embodiment, the present invention relates to a method for inhibiting polymerization and simultaneously breaking emulsions by treating a polymerizable material with the additive composition of the present invention. In one embodiment, the present invention relates to a use of the additive composition of the present invention for inhibiting polymerization and simultaneously breaking emulsions by adding the additive composition to a polymerizable material. In one embodiment, the present invention relates to a use of an additive composition for prevention of fouling caused due to polymerization in a basic solution, wherein a polymerizable material is treated with the additive composition of the present invention.

21 Claims, No Drawings

POLYMERIZATION INHIBITING AND EMULSION BREAKING COMPOSITION AND METHOD OF USE THEREOF

CROSS REFERENCE TO RELATED APPLICATIONS

This application is a filing under 35 U.S.C. 371 of International Application No. PCT/IB2022/050021 filed Jan. 3, 2022, entitled "Polymerization Inhibiting And Emulsion Breaking Composition And Method Of Use Thereof", which claims priority to Indian Patent Application No. 202121002790 filed Jan. 20, 2021, which applications are incorporated by reference herein in their entirety.

FIELD OF THE INVENTION

Firstly, the present invention is not for the purpose of defence.

Particularly, the present invention relates to a polymerization inhibiting and emulsion breaking composition and method of use thereof for inhibiting polymerization and breaking emulsions formed between hydrocarbon and caustic.

More particularly, the present invention relates to a polymerization inhibiting and emulsion breaking composition comprising: an amino acid and a borohydride for inhibiting polymerization and breaking emulsions formed between hydrocarbon and caustic.

The present invention also relates to a use of an additive composition comprising: an amino acids and a borohydride for prevention of fouling caused due to polymerization in a basic solution that is in contact with a gaseous or liquid hydrocarbon stream that is effluent from a hydrocarbon cracking operation.

BACKGROUND OF THE INVENTION

In pyrolytic cracking operations, feedstocks such as ethane, propane, naphtha, kerosene, gas oil, fuel oil and the like undergo "cracking", i.e. the removal of hydrogen, to form unsaturated hydrocarbons. Pyrolytic cracking also tends to produce oxygenated hydrocarbons, including carbonyl compounds such as acetaldehyde. In a typical operation, the cracked effluent stream is quenched and fractionated and compressed. Acidic contaminants such as hydrogen sulfide, carbon dioxide and mercaptans are typically then removed from the effluent hydrocarbon stream by washing in a caustic scrubber.

The caustic scrubber partially removes the oxygenated hydrocarbons. At the same time, however, the basic conditions in the scrubber tend to cause base-induced condensation reactions of the carbonyl compounds, including in particular aldehydes (e.g., acetaldehyde) and/or ketones, which in turn result in the formation of polymers.

The polymerization of oxygenated compounds, such as carbonyl-containing organics in basic solutions, has been stopped by adding amine compounds such as hydroxylamine hydrochloride, hydroxylamine sulfate, hydrazine, carbohydrazides and the like. Several patents relate to methods of inhibiting carbonyl fouling.

The inventor had earlier reported, in the U.S. Pat. No. 6,986,839 B2 (US839), a method to inhibit polymerization, which had also been found to have advantage to dissolve the deposits formed on polymerization. In US839, to inhibit polymerization and to solubilize deposits formed on polymerization, the inventor had suggested use of lactams or amino acids. As per the disclosure of US839, additive selected from the group consisting of 6-amino hexanoic acid, taurine, $NH_2(CH_2)_xYO_zOH$, where x is an integer from 1 to 12, Y can be S or C, and z=1 to 2, isomers, salts, and combinations thereof, and beta alanine and salts thereof is effective to inhibit polymerization and dissolve deposits formed on the polymerization.

The inventor had also reported in US839 that additive selected from the group consisting of an acid salt of 6-amino hexanoic acid with an acid selected from the group consisting of hydrochloric acid, sulfuric acid, perchloric acid and organic acids is effective to inhibit polymerization and dissolve deposits formed on the polymerization.

The inventor had also reported in US839 that additive selected from the group consisting of 6-amino hexanoic acid and sodium salts of 6-amino hexanoic acid is also effective to inhibit polymerization and dissolve deposits formed on the polymerization when the component in the feed stream is a carbonyl compound and when the molar ratio of carbonyl compound to 6-amino hexanoic acid or sodium salts of 6-amino hexanoic acid is between 1:10 and 1:0.01.

However, the inventor has found that the additive disclosed in the US839, which is:

a) either 6-amino hexanoic acid, b) or an acid salt of 6-amino hexanoic acid, c) or a sodium salt of 6-amino hexanoic acid, may be effective in inhibiting the polymerization (in controlling the polymer formation), but these do not overcome the problems of emulsions formed between the hydrocarbon and the caustic, hence the additives of US839 are not effective in avoiding formation of emulsions and in breaking the emulsions formed.

The inventor has observed that time to break the emulsions formed is substantially higher when the additive of US839 is used. As per the experimental data presented in the Table-1 of the present invention, the inventor has found that:

i) for the dosage of 0.25 ml (0.29 g), the time to break the emulsion after toluene extraction is about 4 min, ii) for the dosage of 0.30 ml (0.34 g), the time to break the emulsion after toluene extraction increases to about 5 min, iii) for the dosage of 0.35 ml (0.40 g), the time to break the emulsion after toluene extraction increases to about 7 min, iv) for the dosage of 0.40 ml (0.46 g), the time to break the emulsion after toluene extraction increases to about 12 min, v) for the dosage of 0.50 ml (0.57 g), the time to break the emulsion after toluene extraction increases to about 14 min.

From the above-discussed experimental data of Table 1 of the prior art US839, it is clearly understood that time to break the emulsion is substantially higher at each dosage, which substantially increases further from about 4 min to about 14 min with the increase in dosage from 0.25 ml (0.29 g) to 0.50 ml (0.57 g) of the additive of the US839, and such a composition and a method are highly uneconomical.

NEED OF THE INVENTION

Therefore, there is a need for an additive or an additive composition, which is not only effective in inhibiting and controlling polymerization but is also effective in reducing or almost eliminating a tendency to form emulsions, and if the emulsions are formed, then has tendency to break the emulsions.

Accordingly, there is a need for an additive composition, which is not only effective in inhibiting and controlling polymerization, but is also effective in reducing or almost eliminating a tendency to form emulsions, and if the emulsions are formed, then is effective in breaking the emulsions formed, and time to break the emulsions formed is substantially reduced or lowered even at a lower dosage of the additive composition; and furthermore the time to break the emulsions formed does not increase substantially with increase in the dosage of the additive composition, hence be economical.

Problem to be Solved by the Invention

Therefore, aim of the present invention is to provide an additive composition, which is not only effective in inhibiting and controlling polymerization but is also effective in reducing or almost eliminating tendency to form emulsions, and if the emulsions are formed, then has tendency to break the emulsions.

Accordingly, aim of the present invention is to solve the problems of the prior art by providing an additive composition, which should not only be effective in inhibiting and controlling polymerization, but should also be effective in reducing or almost eliminating tendency to form emulsions, and if the emulsions are formed, then should also be effective in breaking the emulsions formed, and time to break the emulsions formed should be substantially reduced or lowered even at a lower dosage of the additive composition; and furthermore the time to break the emulsions formed should not increase substantially with increase in the dosage of the additive composition, hence be economical.

OBJECTS OF THE INVENTION

Therefore, this is an object of the present invention to provide an additive composition, which is not only be effective in inhibiting and controlling polymerization, but is also be effective in reducing or almost eliminating tendency to form emulsions, and if the emulsions are formed, then is also be effective in breaking the emulsions formed, and time to break the emulsions formed is substantially reduced or lowered even at a lower dosage of the additive composition; and furthermore the time to break the emulsions formed is not increased substantially with increase in the dosage of the additive composition, hence is economical.

This is also an object of the present invention to provide a method for inhibiting and controlling polymerization and simultaneously for breaking emulsions by treating a polymerizable material with the additive composition of the present invention.

This is also an object of the present invention to provide a use of an additive composition for inhibiting and controlling polymerization and simultaneously for breaking emulsions formed by treating a polymerizable material with the additive composition of the present invention.

This is also an object of the present invention to provide a use of an additive composition for prevention of fouling by inhibiting polymerization in a basic solution that is in contact with a gaseous or liquid hydrocarbon stream that is effluent from a hydrocarbon cracking operation.

Further objects of the present invention would be apparent from the following description of the invention.

DESCRIPTION OF THE INVENTION

With aim to solve the above-discussed problems of the prior art, the inventor has found that if a composition comprising: an amino hexanoic acid and a borohydride is added to a polymerizable material or a stream of the polymerizable material, then it, surprisingly and unexpectedly, demonstrates a synergistic effect by being effective in reducing or almost eliminating the tendency to form emulsions, and if the emulsions are formed, then to break the emulsions formed, and also by being effective in inhibiting and controlling the polymerization.

The inventor has found that the composition comprising: an amino hexanoic acid and a borohydride has been surprisingly and unexpectedly found to be suitable to substantially reduce the time to break the emulsions formed even at lower dosage of the additive composition; and furthermore it has also been surprisingly and unexpectedly found that the time to break the emulsions formed does not increase substantially with increase in dosage of the additive composition of the present invention.

Accordingly, in first embodiment, the present invention relates to an additive composition to inhibit and control polymerization, and simultaneously to reduce or almost eliminate tendency to form emulsion, and if the emulsion is formed, then to break the emulsion formed, wherein the additive composition comprises: an amino hexanoic acid and a borohydride.

Accordingly, in second embodiment, the present invention relates to a method to inhibit and control polymerization, and simultaneously to reduce or almost eliminate formation of emulsion, and if the emulsion is formed, then to break the emulsion formed by treating the polymerizable material with the additive composition of the present invention.

Accordingly, in third embodiment, the present invention relates to use of an additive composition for inhibiting and controlling polymerization, and simultaneously for reducing or almost eliminating formation of emulsion, and if the emulsion is formed, then to break the emulsion formed by using the additive composition of the present invention in the stream of the polymerizable material.

Therefore, in one aspect, the present invention relates to an additive composition comprising: an amino hexanoic acid and a borohydride for inhibiting and controlling polymerization and simultaneously for breaking emulsions formed.

In accordance with one of the embodiments of the present invention, the amino hexanoic acid is a 6-amino hexanoic acid, or may be used as: an acid salt of 6-amino hexanoic acid or a sodium salt of 6-amino hexanoic acid, or any other salt of 6-amino hexanoic acid.

In accordance with a preferred embodiment of the present invention, the amino hexanoic acid is preferably a 6-amino hexanoic acid.

In accordance with one of the embodiments of the present invention, the borohydride may be sodium borohydride, potassium borohydride, lithium borohydride, ammonium salt of borohydride, or sodium triisopropoxy borohydride. The ammonium salt of borohydride may be tetramethylammonium borohydride, or tetraethylammonium borohydride.

In accordance with a preferred embodiment of the present invention, the borohydride is preferably a sodium borohydride ($NaBH_4$).

Therefore, in accordance with first embodiment, the present invention relates to an emulsion breaking additive composition comprising:

a) amino hexanoic acid selected from the group comprising: 6-amino hexanoic acid, an acid salt of 6-amino hexanoic acid, a sodium salt of 6-amino hexanoic acid, or a mixture thereof [compound-A]; and b) borohydride selected from the group comprising: sodium borohydride, potassium borohydride, lithium borohydride, ammonium salt of borohydride, sodium triisopropoxy borohydride, or a mixture thereof [compound-B].

Therefore, in accordance with second embodiment, the present invention also relates to an additive composition for breaking emulsions, and simultaneously for inhibiting and controlling polymerization, wherein the additive composition comprises:

a) amino hexanoic acid selected from the group comprising: 6-amino hexanoic acid, an acid salt of 6-amino hexanoic acid, a sodium salt of 6-amino hexanoic acid, or a mixture thereof [compound-A]; and
b) borohydride selected from the group comprising: sodium borohydride, potassium borohydride, lithium borohydride, ammonium salt of borohydride, sodium triisopropoxy borohydride, or a mixture thereof [compound-B].

In accordance with the first and second embodiments of the present invention, the amino hexanoic acid is preferably 6-amino hexanoic acid.

In accordance with the first and second embodiments of the present invention, the borohydride is preferably sodium borohydride ($NaBH_4$).

In accordance with the first and second embodiments of the present invention, the polymerizable material is selected from a material having tendency to get polymerized on heating, on condensation, or on cracking.

In accordance with the first and second embodiments of the present invention, the polymerizable material is a polymer formed on aldol condensation, preferably on aldol condensation of acetaldehyde.

In accordance with the first and second embodiments of the present invention, the ammonium salt of borohydride is selected from the group comprising: tetramethylammonium borohydride, and tetraethylammonium borohydride.

Therefore, in accordance with third embodiment, the present invention relates to a method for breaking emulsion, and simultaneously inhibiting and controlling polymerization of a polymerizable material, wherein the method comprise a step of treating the polymerizable material with an additive composition, wherein the additive composition comprises:

a) amino hexanoic acid selected from the group comprising: 6-amino hexanoic acid, an acid salt of 6-amino hexanoic acid, a sodium salt of 6-amino hexanoic acid, or a mixture thereof [compound-A]; and
b) borohydride selected from the group comprising: sodium borohydride, potassium borohydride, lithium borohydride, ammonium salt of borohydride, sodium triisopropoxy borohydride, or a mixture thereof [compound-B].

In accordance with the third embodiment of the present invention, the amino hexanoic acid is preferably 6-amino hexanoic acid.

In accordance with the third embodiment of the present invention, the borohydride is preferably sodium borohydride ($NaBH_4$).

In accordance with the third embodiment of the present invention, the amino hexanoic acid and the borohydride are preferably added in a one step process as a blend or a mixture in the polymerizable material.

In accordance with the third embodiment of the present invention, the emulsion is formed between a hydrocarbon and caustic.

In accordance with the third embodiment of the present invention, the polymerizable material is selected from a material having tendency to get polymerized on heating, on condensation, or on cracking.

In accordance with the third embodiment of the present invention, the polymerizable material is a polymer formed on aldol condensation, preferably on aldol condensation of acetaldehyde.

Accordingly, in accordance with fourth embodiment, the present invention relates to a use of an additive composition for breaking the emulsion, and simultaneously for inhibiting and controlling polymerization of a polymerizable material, wherein the method comprise a step of adding the additive composition to the polymerizable material, wherein the additive composition comprises:

a) amino hexanoic acid selected from the group comprising: 6-amino hexanoic acid, an acid salt of 6-amino hexanoic acid, a sodium salt of 6-amino hexanoic acid, or a mixture thereof [compound-A]; and
b) borohydride selected from the group comprising: sodium borohydride, potassium borohydride, lithium borohydride, ammonium salt of borohydride, sodium triisopropoxy borohydride, or a mixture thereof [compound-B].

In accordance with the fourth embodiment of the present invention, the amino hexanoic acid is preferably 6-amino hexanoic acid.

In accordance with the fourth embodiment of the present invention, the borohydride is preferably sodium borohydride ($NaBH_4$).

In accordance with the fourth embodiment of the present invention, the amino hexanoic acid and the borohydride are preferably added in a one step process as a blend or a mixture in the polymerizable material.

In accordance with the fourth embodiment of the present invention, the emulsion is formed between a hydrocarbon and caustic.

In accordance with the fourth embodiment of the present invention, the polymerizable material is selected from a material having tendency to get polymerized on heating, on condensation, or on cracking.

In accordance with the fourth embodiment of the present invention, the polymerizable material is a polymer formed on aldol condensation, preferably on aldol condensation of acetaldehyde.

Accordingly, in accordance with fifth embodiment, the present invention relates to a use of an additive composition for preventing fouling, wherein the method comprises a step of adding the additive composition to the polymerizable material, wherein the additive composition comprises:

a) amino hexanoic acid selected from the group comprising: 6-amino hexanoic acid, an acid salt of 6-amino hexanoic acid, a sodium salt of 6-amino hexanoic acid, or a mixture thereof [compound-A]; and
b) borohydride selected from the group comprising: sodium borohydride, potassium borohydride, lithium borohydride, ammonium salt of borohydride, sodium triisopropoxy borohydride, or a mixture thereof [compound-B].

In accordance with the fifth embodiment of the present invention, the amino hexanoic acid is preferably 6-amino hexanoic acid.

In accordance with the fifth embodiment of the present invention, the borohydride is preferably sodium borohydride ($NaBH_4$).

In accordance with the fifth embodiment of the present invention, the emulsion is formed between a hydrocarbon and caustic.

In accordance with the fifth embodiment of the present invention, the polymerizable material is selected from a material having tendency to get polymerized on heating, on condensation, or on cracking.

In accordance with the fifth embodiment of the present invention, the polymerizable material is a polymer formed on aldol condensation, preferably on aldol condensation of acetaldehyde.

In accordance with the fifth embodiment of the present invention, the fouling is caused or formed by polymerization of a polymerizable material in a basic solution, In accordance with the fifth embodiment of the present invention, the basic solution is in contact with a gaseous stream or a liquid hydrocarbon stream.

In accordance with the fifth embodiment of the present invention, the gaseous stream and the liquid hydrocarbon stream is an effluent from a hydrocarbon cracking operation.

In accordance with the fifth embodiment of the present invention, the amino hexanoic acid and the borohydride are preferably added in a one step process as a blend or a mixture in the polymerizable material.

In accordance with the fifth embodiment of the present invention, the fouling is caused by polymerization in a basic solution that is in contact with a gaseous or liquid hydrocarbon stream that is effluent from a hydrocarbon cracking operation.

In accordance with one of embodiments of the present invention, the components: the amino hexanoic acid and the borohydride of the present additive composition may be added in any order in the polymerizable material.

However, it has been found that if the components: the amino hexanoic acid and the borohydride of the present additive composition are added together as a blend or a mixture in the polymerizable material, then it has been surprisingly and unexpectedly found that the time to break the emulsions formed is substantially lowered as compared to separately adding the components: the amino hexanoic acid and the borohydride of the present additive composition.

Therefore, in accordance with one of the more preferred embodiments of the present invention, it relates to a method for inhibiting and controlling polymerization, and to break emulsions by treating a polymerizable material with an additive composition, wherein the additive composition comprises:

a) amino hexanoic acid; and b) borohydride; and wherein the amino hexanoic acid and the borohydride are added together as a blend or a mixture in the polymerizable material.

In accordance with one of the preferred embodiments of the present invention, it has been surprisingly and unexpectedly found that:

i) for the dosage of 0.25 ml (0.29 g) of the present composition comprising: about 98% of 6-amino hexanoic acid and about 2% of sodium borohydride (NaBH4), the time to break the emulsion after toluene extraction is immediate as against about 4 min when the additive of prior art was used;

ii) similarly, for the dosage of 0.30 ml (0.34 g) of the present composition comprising: about 98% of 6-amino hexanoic acid and about 2% of sodium borohydride (NaBH4), the time to break the emulsion after toluene extraction is about 1 min as against about 5 min when the additive of prior art was used;

iii) similarly, for the dosage of 0.35 ml (0.40 g) of the present composition comprising: about 98% of 6-amino hexanoic acid and about 2% of sodium borohydride (NaBH4), the time to break the emulsion after toluene extraction is about 3 min as against about 7 min when the additive of prior art was used;

iv) similarly, for the dosage of 0.40 ml (0.46 g) of the present composition comprising: about 98% of 6-amino hexanoic acid and about 2% of sodium borohydride (NaBH4), the time to break the emulsion after toluene extraction is about 4 min as against about 12 min when the additive of prior art was used;

v) similarly, for the dosage of 0.50 ml (0.57 g) of the present composition comprising: about 98% of 6-amino hexanoic acid and about 2% of sodium borohydride (NaBH4), the time to break the emulsion after toluene extraction is about 4 min as against about 14 min when the additive of prior art was used.

In accordance with one of the preferred embodiments of the present invention, the 6-amino hexanoic acid may be prepared by any method known in the art including, but not limited to the methods described in examples 3, 4 or 10 of the U.S. Pat. No. 6,986,839 B2 (US839).

As per one of the preferred embodiments, the polymer control may be measured by any known method. In the examples of the present invention, the polymer control is measured by toluene soluble readings, and emulsion breaking tendency is measured by time taken for the toluene and caustic phase to separate.

TECHNICAL ADVANTAGES OF THE INVENTION

As can be understood from the foregoing discussions of the experimental findings, the problems of the prior art have been solved, and the additive composition of the present invention has been surprisingly and unexpectedly found to have technical advantages of being effective not only in inhibiting and controlling the polymerization, but also being effective in reducing or almost eliminating a tendency to form emulsions, and if the emulsions are formed, then to break the emulsions within substantially reduced time.

Based on the experimental results of the present invention, the inventor, without being bound by the theory or the mechanism, has found that the emulsion is formed on adding the prior art additive: 6-amino hexanoic acid to the polymerizable material, and this appears to be the reason for substantial increase in time to break the emulsion in a two-step process of the present invention. However, on combining the 6-amino hexanoic acid with the $NaBH_4$, that is, on adding the additive composition of the present invention in a one step process as a blend or as a mixture, the emulsion formed breaks much faster than on individually using the prior art additives, i.e. the 6-amino hexanoic acid additive of the U.S. Pat. No. 6,986,839 B2 (US839) and the $NaBH_4$ additive of the U.S. Pat. No. 5,582,808 (US808), which confirms synergistic effect of the present invention.

Therefore, the present invention has been found to have both of the following technical advantages:

a) in inhibiting and controlling the polymerization; and
b) having a tendency to reduce or almost eliminate formation of emulsion, and if the emulsion is formed, then tendency to break the emulsion faster than the prior art additives (i.e. of US839 and US808).

It may be noted herein, that neither US839 nor US808 discuss problems of emulsions formed between hydrocarbon and caustic, then question of providing a solution to this problem does not arise in US839 and US808.

Therefore, in accordance with the present invention, time to break the emulsions formed has been substantially reduced even at the lower dosages of the present additive composition; and furthermore the time to break the emulsions formed is also not increased substantially with increase in dosage of the additive composition of the present invention.

The present invention also overcomes the problems of borohydrides as used in the prior art U.S. Pat. No. 5,582,808 (US808), wherein substantially higher amount of the borohydride was required, particularly at about 4:1:carbonyl: borohydride molar ratio or at least about 25%. Furthermore, the time to break the emulsions may have been reduced on using the borohydride, but the polymerization is still higher. As can be observed from the attached experimental data, as per the present invention, the amount of the borohydride is generally very low, which not only results in faster breaking of emulsions, but also results in inhibition and control of polymerization.

In accordance with embodiments of the present invention, the present composition may comprise:

a) from about 99.9% to 90% by wt. of the amino hexanoic acid and about 0.1% to 10% by wt. of the borohydride,
b) preferably from about 99.9% to 95% by wt. of the amino hexanoic acid and about 0.1% to 5% by wt. of the borohydride,
c) more preferably from about 99.9% to 97% by wt. of the amino hexanoic acid and about 0.1% to 3% by wt. of the borohydride,
d) even more preferably from about 99.9% to 97.5% by wt. of the amino hexanoic acid and about 0.1% to 2.5% by wt. of the borohydride;
e) even more preferably from about 99.9% to 98.5% by wt. of the amino hexanoic acid and about 0.1% to 1.5% by wt. of the borohydride;

as aim of the present invention is to reduce the amount of the borohydride,

In accordance with embodiments of the present invention, the amount of the present composition as may be added to the polymerizable material may vary:

(i) from about 5 ppm to 3000 ppm;
(ii) preferably from about 5 ppm to 2000 ppm;
(iii) more preferably from about 5 ppm to 1000 ppm;
(iv) even more preferably from about 5 ppm to 500 ppm;

as aim of the present invention is to reduce the amount of additive composition.

The polymerizable material as referred herein is a material which has tendency to get polymerize either on heating, or on condensation, or on cracking. As per one of the embodiments of the present invention, the polymerizable material as referred herein is a polymer formed due to aldol condensation, preferably due to aldol condensation of acetaldehyde, which may also be referred to as aldol or red tide polymers in the industry, wherein vinyl acetate (VA) is the source of acetaldehyde.

The emulsions as referred herein are the emulsions formed between hydrocarbon and caustic, which hamper hydrocarbon and caustic separation process. The presently provided additive composition has technical advantage of not only lowering the polymerization, i.e. polymer formation, but also reducing or almost eliminating tendency to form emulsion, and if the emulsion is formed, then tendency to break emulsion formed between hydrocarbon and caustic.

EXAMPLES

The present additive composition may be prepared in any manner, and may be used in any manner for inhibiting polymerization and simultaneously breaking emulsions formed between hydrocarbon and caustic.

In accordance with one of the embodiments of the present invention, 6-amino hexanoic acid used in the present examples may be prepared by any method known in the art including, but not limited to the methods described in examples 3, 4 or 10 of the U.S. Pat. No. 6,986,839 B2 (US839), and sodium borohydride ($NaBH_4$) used in the present examples is as commercially available.

For experimental results, a reference may be drawn to the experimental data presented in the following tables: Table-I and Table-II, which are not intended to limit the scope of the present invention.

In the present examples, the polymer control is measured by toluene soluble readings, and emulsion breaking tendency is measured by time taken for the toluene and caustic phase to separate. It may be noted that tighter the emulsion more time it will take to break the emulsion, and higher the tendency to form an emulsion longer the time to break.

As can be observed from the accompanying experimental results, the prior art additive: $NaBH_4$ takes a shorter time for toluene (a hydrocarbon) and caustic phase to separate, but the amount of the polymer formed is higher, therefore, it is not a preferred choice of the industry.

As can also be observed from the accompanying experimental results, the prior art additive: 6-amino hexanoic acid takes a longer time for toluene (a hydrocarbon) and caustic phase to separate, therefore, it is also not a preferred choice of the industry.

As can also be observed from the accompanying experimental results, the comparative additive compositions comprising: (a) 6-amino hexanoic acid and (b) hydroxylamine chloride, or sodium dithionite, or ethylene diamine, take a longer time for toluene (a hydrocarbon) and caustic phase to separate, therefore, these are also not a preferred choice of the industry.

However, the present invention composition comprising: (a) 6-amino hexanoic acid and (b) $NaBH_4$ takes a shorter time for toluene (a hydrocarbon) and caustic phase to separate, and the amount of the polymer formed is also lower, therefore, it is a preferred choice of the industry.

TABLE I

| Amount of Additive or Composition [in ml (g) | % Toluene Soluble (Time to break emulsion after Toluene Extraction) | | | | |
|---|---|---|---|---|---|
| | | Alkaline solution of 42% 6-amino hexanoic acid and 14% NaOH [Product A] Prior art additive | $NaBH_4$ (12% solution) Prior art additive | 98.5% of Product A and 1.5% of $NaBH_4$ Invention Composition | 98% of Product A and 2% of $NaBH_4$ Invention Composition |
| Blank | 0.48 (Immediate) | | | | |
| 0.25 ml (0.29 g) | | 0.14 (4 min) | 0.32 (<1 min) | 0.17 (2 min) | 0.2 (Immediate) |
| 0.30 ml (0.34 g) | | 0.14 (5 min) | 0.29 (<1 min) | 0.12 (2 min) | 0.13 (1 min) |
| 0.35 ml (0.40 g) | | 0.09 (7 min) | 0.19 (<1 min) | 0.09 (3 min) | 0.09 (3 min) |
| 0.40 ml (0.46 g) | | 0.08 (12 min) | 0.15 (<1 min) | 0.07 (5 min) | 0.07 (4 min) |
| 0.50 ml (0.57 g) | | 0.05 (14 min) | 0.12 (<1 min) | 0.06 (6 min) | 0.07 (4 min) |

TABLE II

| Amount of Additive or Composition [in ml (g)] | % Toluene Soluble (Time to break emulsion after Toluene Extraction) | | | | | |
|---|---|---|---|---|---|---|
| | 98.5% of Product A and 1.5% of Hydroxylamine Chloride Comparative Composition | 98% of Product A and 2% of Hydroxylamine Chloride Comparative Composition | 98.5% of Product A and 1.5% of Sod. Dithionite Comparative Composition | 98% of Product A and 2% of Sod. Dithionite Comparative Composition | 98.5% of Product A and 1.5% of EDA Comparative Composition | 98% of Product A and 2% of EDA Comparative Composition |
| 0.25 ml (0.29 g) | 0.2 (3 min) | 0.2 (2 min) | 0.16 (2 min) | 0.025 (6 min) | 0.17 (2 min) | 0.18 (2 min) |
| 0.30 ml (0.34 g) | 0.14 (5 min) | 0.14 (4 min) | 0.15 (3 min) | 0.024 (8 min) | 0.17 (3 min) | 0.21 (3 min) |
| 0.35 ml (0.40 g) | 0.14 (6 min) | 0.09 (11 min) | 0.1 (4 min) | 0.027 (30 min) | 0.12 (5 min) | 0.15 (9 min) |
| 0.40 ml (0.46 g) | 0.1 (10 min) | 0.08 (13 min) | 0.1 (11 min) | 0.025 (33 min) | 0.14 (9 min) | 0.17 (15 min) |
| 0.50 ml (0.57 g) | 0.07 (22 min) | 0.07 (36 min) | 0.07 (14 min) | 0.021 (45 min) | 0.1 (24 min) | 0.11 (18 min) |

Sod. Dithionite is Sodium Dithionite, and EDA is Ethylene diamine.

The invention claimed is:

1. An additive composition for breaking an emulsion, and simultaneously inhibiting and controlling polymerization of a polymerizable material, wherein the composition comprises:

(a) amino hexanoic acid comprising: 6-amino hexanoic acid, an acid salt of 6-amino hexanoic acid, a sodium salt of 6-amino hexanoic acid, or a mixture thereof [compound-A]; and (b) borohydride comprising: sodium borohydride ($NaBH_4$), potassium borohydride, lithium borohydride, ammonium salt of borohydride, sodium triisopropoxy borohydride, or a mixture thereof [compound-B];

wherein the amino hexanoic acid is taken in an amount varying from about 99.9% to 90% by wt, and wherein the borohydride is taken in an amount varying from about 0.1% to 10% by wt.

2. The additive composition as claimed in claim 1, wherein the polymerizable material is selected from a material having tendency to get polymerized on heating, on condensation, or on cracking.

3. The additive composition as claimed in claim 1, wherein the polymerizable material is-forms a polymer on base-induced condensation of carbonyl compound including aldehydes, and/or ketones, particularly on the aldol condensation of acetaldehyde.

4. The additive composition as claimed in claim 1, wherein the ammonium salt of borohydride comprises: tetramethylammonium borohydride, or tetraethylammonium borohydride.

5. A method for breaking an emulsion, and simultaneously inhibiting and controlling polymerization of a polymerizable material, wherein the method comprises a step of treating the polymerizable material with an additive composition, wherein the additive composition comprises:

(a) amino hexanoic acid comprising: 6-amino hexanoic acid, an acid salt of 6-amino hexanoic acid, a sodium salt of 6-amino hexanoic acid, or a mixture thereof [compound-A]; and (b) borohydride comprising: sodium borohydride, potassium borohydride, lithium borohydride, ammonium salt of borohydride, sodium triisopropoxy borohydride, or a mixture thereof [compound-B];

wherein the amino hexanoic acid is taken in an amount varying from about 99.9% to 90% by wt, and wherein the borohydride is taken in an amount varying from about 0.1% to 10% by wt.

6. The method as claimed in claim 5, wherein the amino hexanoic acid and the borohydride are added in a one step process as a blend or a mixture in the polymerizable material.

7. The method as claimed in claim 5, wherein the emulsion is formed between a hydrocarbon and caustic.

8. The method as claimed in claim 5, wherein the polymerizable material is selected from a material having tendency to get polymerized on heating, on condensation, or on cracking.

9. The method as claimed in claim 5, wherein the polymerizable material forms a polymer on base-induced condensation of carbonyl compound including aldehydes and/or ketones, particularly on aldol condensation of acetaldehyde.

10. A method of using an additive composition for breaking an emulsion, and simultaneously for inhibiting and controlling polymerization of a polymerizable material, wherein the method comprises a step of adding the additive composition of claim 1 to the polymerizable material.

11. The method as claimed in claim 10, wherein the amino hexanoic acid and the borohydride are preferably-added in a one step process as a blend or a mixture in the polymerizable material.

12. The method as claimed in claim 10, wherein the emulsion is formed between a hydrocarbon and caustic.

13. The method as claimed in claim 10, wherein the polymerizable material is selected from a material having tendency to get polymerized on heating, on condensation, or on cracking.

14. The method as claimed in claim 10, wherein the polymerizable material forms a polymer on base-induced condensation of carbonyl compound including aldehydes and/or ketones, particularly on aldol condensation of acetaldehyde.

15. A method of using an additive composition for preventing fouling, wherein the method comprises a step of adding the additive composition of claim 1 to a polymerizable material.

16. The method as claimed in claim 15, wherein the polymerizable material is selected from a material having tendency to get polymerized on heating, on condensation, or on cracking.

17. The method as claimed in claim 15, wherein the polymerizable material forms a polymer on base-induced condensation of carbonyl compound including aldehydes, and/or ketones, particularly on aldol condensation of acetaldehyde.

18. The method as claimed in claim 15, wherein the fouling is formed by polymerization of the polymerizable material in a basic solution.

19. The method as claimed in claim 18, wherein the basic solution is in contact with a gaseous stream or a liquid hydrocarbon stream.

20. The method as claimed in claim 19, wherein the gaseous stream and the liquid hydrocarbon stream is an effluent from a hydrocarbon cracking operation.

21. The method as claimed in claim 15, wherein the amino hexanoic acid and the borohydride are added in a one step process as a blend or a mixture in the polymerizable material.

* * * * *